(12) United States Patent
Braslavsky et al.

(10) Patent No.: US 11,713,236 B2
(45) Date of Patent: Aug. 1, 2023

(54) RETAIL FUELING STATION SYSTEM AND METHOD FOR EFFECTING A CONSUMER TRANSACTION

(71) Applicant: Circle K Tech Inc., Laval (CA)

(72) Inventors: David Braslavsky, Ottawa (CA); Deepak Wanner, Ottawa (CA); Jingsong Li, Kanata (CA)

(73) Assignee: Circle K Tech Inc., Laval, CA (US)

( * ) Notice: Subject to any disclaimer, the term of this patent is extended or adjusted under 35 U.S.C. 154(b) by 102 days.

(21) Appl. No.: 16/821,325

(22) Filed: Mar. 17, 2020

(65) Prior Publication Data

US 2020/0307988 A1 Oct. 1, 2020

Related U.S. Application Data

(60) Provisional application No. 62/825,009, filed on Mar. 27, 2019.

(51) Int. Cl.

| | |
|---|---|
| *B67D 7/04* | (2010.01) |
| *G06Q 30/02* | (2023.01) |
| *H04W 4/80* | (2018.01) |
| *G06Q 20/20* | (2012.01) |
| *G06Q 30/0226* | (2023.01) |

(52) U.S. Cl.
CPC ......... *B67D 7/0401* (2013.01); *G06Q 20/209* (2013.01); *G06Q 30/0233* (2013.01); *H04W 4/80* (2018.02); *B67D 2007/0442* (2013.01); *B67D 2007/0457* (2013.01)

(58) Field of Classification Search
CPC .......... B67D 7/0401; B67D 2007/0442; B67D 2007/0457; H04W 4/80; G06Q 20/209; G06Q 30/0233

USPC ............................................................. 141/1
See application file for complete search history.

(56) References Cited

U.S. PATENT DOCUMENTS

| | | | | |
|---|---|---|---|---|
| 6,070,156 | A * | 5/2000 | Hartsell, Jr. | ........... G07C 5/008 |
| | | | | 705/413 |
| 6,152,591 | A * | 11/2000 | McCall | .................... B67D 7/14 |
| | | | | 700/231 |
| 6,734,798 | B2 | 5/2004 | Smith | |
| 6,991,160 | B2 | 1/2006 | Demere | |
| 7,107,231 | B1 * | 9/2006 | Hall | .................. G06Q 30/0273 |
| | | | | 705/14.38 |
| 7,948,376 | B2 | 5/2011 | DeLine | |
| 3,032,414 | A1 | 10/2011 | Payne et al. | |
| 8,438,064 | B2 | 5/2013 | Berrio et al. | |
| 9,069,934 | B1 | 6/2015 | Meeboer | |
| 9,087,427 | B2 | 7/2015 | Weston et al. | |

(Continued)

*Primary Examiner* — Timothy P. Kelly
*Assistant Examiner* — Stephanie A Shrieves
(74) *Attorney, Agent, or Firm* — Merchant & Gould P.C.

(57) ABSTRACT

A transaction appliance is located within a retail fueling station environment. Presence of a consumer vehicle at a fuel dispenser is detected and the transaction appliance transmits a transaction trigger to a transaction server located remotely outside the retail fueling station environment. The transaction server responsively invokes personalized consumer data associated with the transaction trigger including advertising and promotions for purchasing products and services from a vendor. The personalized transaction data is provided to the consumer by way of the transaction appliance and a fuel dispenser user interface during the time the consumer is dispensing fuel.

20 Claims, 6 Drawing Sheets

(56) References Cited

U.S. PATENT DOCUMENTS

| | | |
|---|---|---|
| 9,135,615 B1 | 9/2015 | Mutha |
| 9,830,637 B2 | 11/2017 | Betancourt et al. |
| 10,155,652 B2 | 12/2018 | Carapelli et al. |
| 10,332,083 B2 | 6/2019 | Williams et al. |
| 10,678,837 B2 | 6/2020 | Fieglein et al. |
| 10,726,508 B2 | 7/2020 | Morris et al. |
| 2003/0028285 A1* | 2/2003 | Zura ................ G06Q 10/08 700/241 |
| 2003/0065567 A1* | 4/2003 | Dodson ............. G06Q 20/204 705/16 |
| 2003/0130891 A1* | 7/2003 | Jacobs .............. G06Q 30/0269 705/14.66 |
| 2007/0119859 A1* | 5/2007 | Harrell .................. G07F 9/026 222/23 |
| 2008/0308628 A1* | 12/2008 | Payne ................... G07F 9/001 235/381 |
| 2015/0106196 A1 | 4/2015 | Williams et al. |
| 2015/0149284 A1* | 5/2015 | Williams .......... G06Q 30/0251 705/14.56 |
| 2015/0242969 A1* | 8/2015 | Pallas ................... B67D 7/145 705/39 |
| 2016/0005100 A1* | 1/2016 | Zaremba ............... G06Q 20/18 705/14.27 |
| 2017/0308964 A1* | 10/2017 | Morris .................. G07F 13/025 |
| 2017/0308965 A1* | 10/2017 | Morris .................. G07F 13/025 |
| 2017/0362076 A1* | 12/2017 | Hall ....................... H04W 4/44 |
| 2018/0009651 A1* | 1/2018 | Payne ................... H04W 4/023 |
| 2018/0022596 A1 | 1/2018 | Grice et al. |
| 2018/0108205 A1* | 4/2018 | Symonds ............. G06Q 20/20 |
| 2018/0352265 A1* | 12/2018 | Carapelli ............. G06Q 30/02 |
| 2019/0228480 A1* | 7/2019 | Williams ............ B67D 7/0401 |
| 2019/0389718 A1* | 12/2019 | Patil .................... G06Q 20/4014 |
| 2020/0122998 A1* | 4/2020 | Stumpf ................. H01Q 1/3208 |
| 2022/0081278 A1 | 3/2022 | Braslavsky et al. |
| 2022/0207566 A1 | 6/2022 | Braslavsky et al. |

* cited by examiner

RETAIL FUELING STATION SYSTEM AND METHOD FOR EFFECTING A CONSUMER TRANSACTION

CROSS-REFERENCE TO RELATED APPLICATIONS

This application is based upon and claims the benefit of provisional application Ser. No. 62/825,009, filed Mar. 27, 2019 which is incorporated fully herein by reference.

TECHNICAL FIELD

A system and method for presenting personalized consumer data to a consumer at a fuel dispenser during the fuel dispensing period.

BACKGROUND

Within a retail fueling station environment a consumer transaction at a fuel dispenser typically involves interaction between the consumer and a fuel dispenser user interface. The consumer transaction typically includes payment for fuel product and may also include purchasing additional products and services from a vendor. A vendor may include a convenience store (C-store) and/or a quick serve food outlet or restaurant located within the retail fueling environment or may include a remote vendor of goods and/or services.

The consumer inputs transaction information by pressing keys and/or buttons on the user interface to effect the consumer transaction, for example the type and amount of fuel to be dispensed. In response, output is provided to the consumer typically by way of a visual display device and other indicators. The consumer authorizes payment for the transaction by swiping a payment card or insertion of a chip based payment card or other form of mobile payment device at the fuel dispenser. The consumer subsequently dispenses fuel and interacts with the user interface to complete the transaction.

The user interface facilitates the consumer transaction with the fuel dispenser. The user interface typically includes input and output (IO) components including, a visual display device, keypad, printer, readers for payment cards and other related components. The visual display device provides transaction information such as transaction related prompts and advertising to the consumer—it includes a monochrome or color LCD display and may also incorporate a touchscreen panel allowing the consumer to use soft keys to respond to information requests presented to the consumer via the touchscreen panel. A keypad is used for inputting transaction data for purchasing products as well as to enter an authentication code or a personal identification number (PIN). The user interface also includes components for interfacing with payment cards such as magnetic stripe cards and smart cards, radio frequency identification (RFID) devices, near field communications (NFC) devices as well as mobile payment devices. A printer provides a hard copy transaction receipt and may also be used for printing and providing promotional information or reward coupons. The user interface may also include other components to receive consumer information including an optical reader, facial recognition sensor and/or other biometric sensors.

The fuel dispenser determines that the consumer desires to initiate a fueling session by detecting the removal of a pump handle and pressing keys on the user interface keypad. Each step for initiating the fueling session generally requires the consumer to input information and fueling preferences such as the fuel grade, the amount of fuel, payment information and the like. If a consumer is a repeat or regular client the consumer generally must reenter the same information each time the consumer wishes to initiate a fueling session which is repetitive and time consuming.

Once the payment is authorized a fuel pump is activated and fuel dispensing begins. The fuel dispensing time varies according to the consumer preferences; for example the desired amount of fuel or a payment amount. Fuel dispensing time is invariably a finite amount of time lasting several minutes. During the fuel dispensing time it is important for the consumer to monitor the fueling process, further it may be desirable to engage the consumer with additional information during this time by displaying content on the fuel dispenser's visual display device. The visual display device content is generally static, alternatively the content may provide bulk advertising promotions and related prompts. Bulk advertising promotions are targeted to a wide consumer audience and may or may not be relevant or applicable to the consumer. Further the consumer's native language may be different from the language provided by the user interface, hence the consumer may not understand the advertising promotions nor understand how to respond to the related prompts.

Conventional fuel dispensers provide a user interface that vary according to the fuel brand. The user interface also varies with different fuel environments based on the installed fuel dispenser manufacturer. For example the consumer may be required to respond to an enquiry to receive a payment receipt. Based upon the fuel dispenser user interface the receipt inquiry may be presented before fuel dispensing or after fuel dispensing. Hence, the consumer may not know when a response to an inquiry is required.

Transaction processing within the fueling station environment includes capturing, storage and transferring of confidential consumer information including credit card information and other personal information such as loyalty account numbers, preferences, biometric data, etc. Fuel dispensers and user interface components need to be connected to the dispenser network (DN), local area network and other intermediate devices such that confidential consumer information can pass through the system. By having confidential consumer information pass through the fueling station environment creates a security vulnerability for that information to be exposed, stolen or used maliciously.

Recently a mobile personal communication device (MD) such as a cell phone or tablet computer have been deployed for conducting a consumer transaction. Accordingly a personal communication device can be used with a 'smart' retail fuel dispenser. The personal communication device may be mobile, handheld, attached to the customer, and/or may be located fixed in location within or associated with a vehicle. By interacting with an application specific user interface on the personal communication device, the consumer provides input and receives output to conduct a transaction. In this manner, the consumer interacts with the personal communication device to conduct a transaction as opposed to the fuel dispenser user interface.

The aforementioned system may be cumbersome and annoying for the consumer since the personal communication device requires a previous download of an application for the particular fueling brand before arriving at the fueling station. This also requires a signup process for the consumer to complete for each different fuel brand or loyalty program, the signup process can be lengthy which may decrease enrollment and participation. Having multiple mobile applications require different user prompting/experience when invoked for a specific site or retailer adding further complexity and disincentive for the consumer. Furthermore these systems require that the personal communication device is suitably present and active during the fueling period, which may or may not be the case.

Hence, the complexities of different user interfaces, time consuming input requirements, security concerns and non-relevant and potentially annoying advertising could dissuade the consumer from purchasing products and services or further cause the consumer to avoid the retail site in the future. Retailers are equally dissuaded by the high upgrade costs for smart fuel dispensers, application servers, software and maintenance. Many retail fueling station owners cannot economically justify the high costs versus the return on investment thereby preventing adoption and widespread deployment of systems to monetize the fuel dispensing time. Accordingly, there is a need for more efficient and improved system and method for presenting personalized consumer data a fuel dispenser during the fuel dispensing period and effecting a consumer transaction.

SUMMARY OF THE INVENTION

Aspects described herein are directed towards a system and method for presenting personalized consumer data to a consumer at a fuel dispenser during the fuel dispensing period. The system and method is configured to display personalized consumer data including an advertisement or one or more redeemable discount coupons for purchasing products and services, triggered by the presence of a consumer vehicle at a fuel dispenser. In a preferred embodiment the system and method presents personalized consumer data related to products and services from a vendor that is intended to interest the consumer and further facilitates a consumer transaction to minimize otherwise required consumer interaction. Thus the system and method provides the consumer a user friendly streamlined experience for purchasing products and services from a vendor during the time the consumer is dispensing fuel.

A transaction appliance is located within a retail fuel dispensing environment and a transaction server is located remotely outside the retail fueling station environment. Presence of a consumer vehicle at a fuel dispenser is detected and consumer vehicle information is transmitted to the transaction appliance. The transaction appliance, responsively transmits a transaction trigger to a transaction server located remotely outside the retail fueling station environment. The transaction server produces personalized consumer data such as an advertisement or one or more redeemable discount coupons for purchasing products and services from a vendor as well as other data related to loyalty programs, promotions and contests. The personalized consumer data is provided to the consumer by way of the transaction appliance and a fuel dispenser user interface during the fuel dispensing time. In response to the personalized consumer data provided to the consumer, a consumer transaction is then performed based on the selection made by the consumer interacting with the fuel dispenser user interface.

To the accomplishment of the foregoing and related ends, the disclosed aspects will hereinafter be described in conjunction with the appended drawings. The disclosed aspects are intended to illustrate and not limit the ways in which the principles of various aspects may be employed and include all such aspects and their equivalents.

DETAILED DESCRIPTION

The present invention is directed toward a system and method for effecting a consumer transaction within a retail fueling station environment. Specifically, personalized consumer data including advertising and promotion information for purchasing products and services from a vendor is offered to the consumer during the time the consumer is dispensing fuel. The consumer interacts with the fuel dispenser user interface to complete the transaction such as purchasing products and services from a vendor within the retail fueling environment or may include a remote vendor of goods and/or services. The embodiments set forth below represent the necessary information to enable those skilled in the art to practice the invention and illustrate the best mode of practicing the invention.

Figure 1:
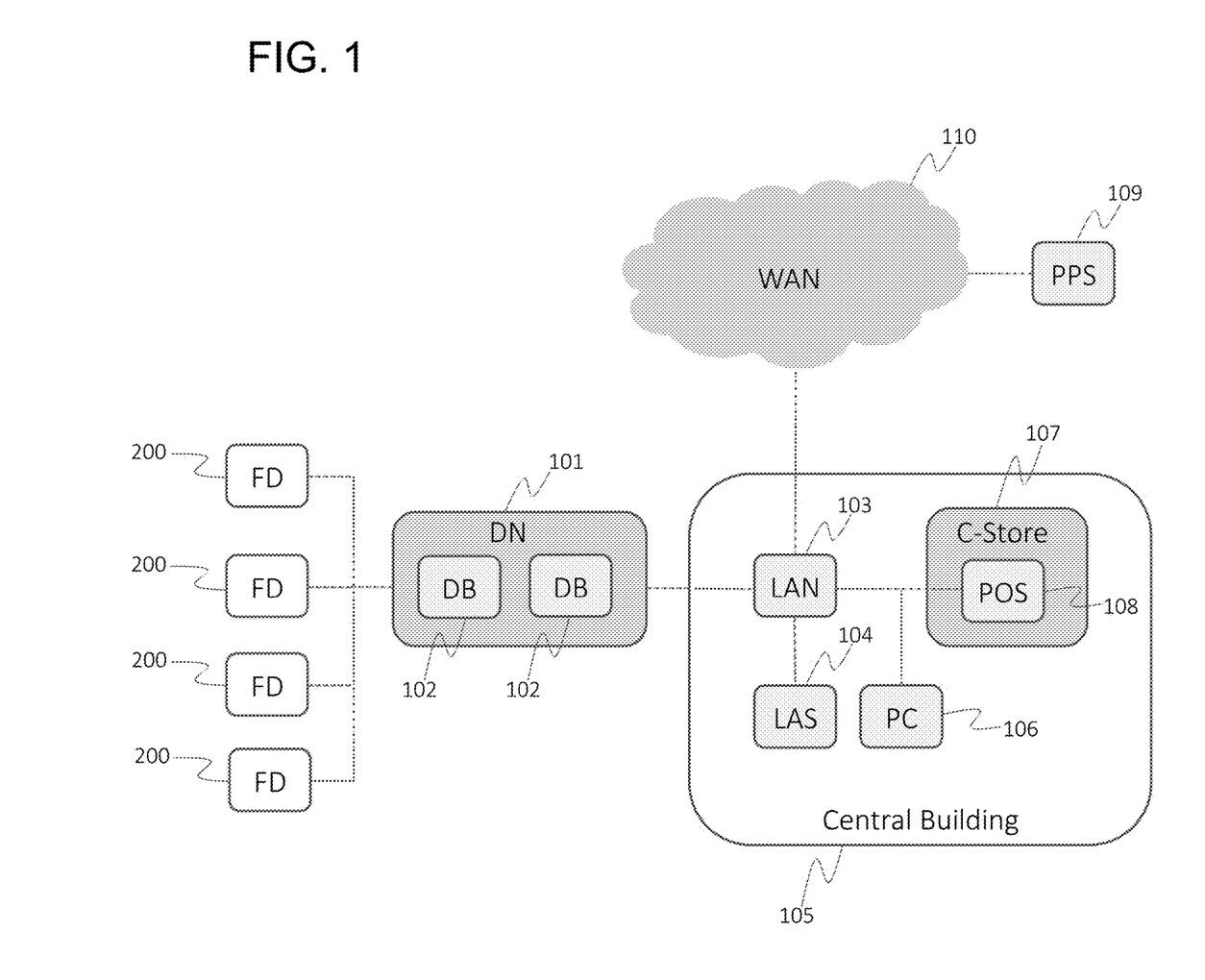
FIG. 1 is a block diagram of an exemplary retail fueling station environment in accordance with the present invention.

FIG. 1 illustrates a block diagram of an exemplary retail fueling station environment in accordance with the present invention. The retail fueling station environment typically includes a central building 105 one or more fuel dispensers (FD) 200 and a dispenser network (DN) 101. The central building 105 typically includes a premises controller (PC) 106, a point of sale (POS) 108 system, a convenience store (C-Store) 107 and may also include a quick serve food outlet or restaurant. The premises controller 106 controls the fuel dispensers 200, processes transactions as well as other related activities and is well understood in the art. The premises controller 106 may be a standalone component or may be incorporated within the point of sale system 108. The premises controller 106 communicates with a remote payment processing system (PPS) 109 for authorizing payment transactions as well as other related activities by way of a communication link to a wide area network (WAN) 110. As described above, the plurality of fuel dispensers 200 are operatively connected to the dispenser network 101 which generally includes a dispenser hub which may be accomplished via additional devices, such as distribution box (DB) 102 as is understood in the art. The dispenser network 101 is operatively connected to the premises controller 106 via a premises local area network 103 or other intermediate devices such as a network router.

Figure 2:
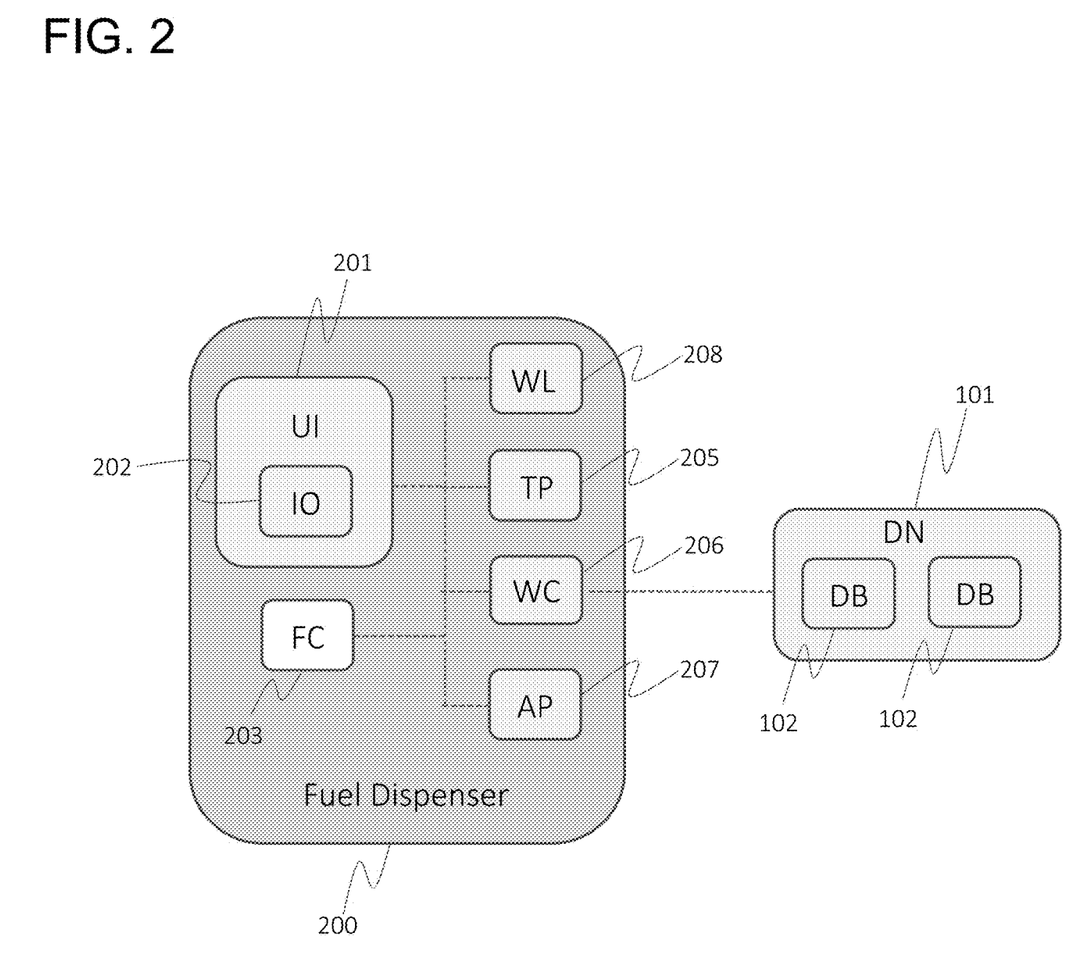
FIG. 2 is a block diagram of exemplary fuel dispenser.

FIG. 2 illustrates a block diagram of an exemplary fuel dispenser in accordance with the present invention. The fuel dispenser 200 includes a user interface 201, one or more controllers and one or more communication modules. The controllers include a fuel dispensing controller (FC) 203, one or more transaction processors (TP) 205 and one or more application processors (AP) 207. The communication module(s) includes a wired communication module (WC)

206 and may also include a wireless communication module (WL) 208. The wireless communication module 208 can include a transceiver communicating via Bluetooth protocol, and/or WIFI protocol. The wired communications communication module 206 operatively connects the fuel dispenser 200 to the dispenser network 101.

The user interface 201 includes components to facilitate consumer interaction with the fuel dispenser 200. The user interface 201 includes a key pad component for inputting data for purchasing fuel or other products and/or services. The key pad component is also used for inputting an authentication code or a personal identification number. The user interface may also include other input and output components 202 including a camera, an optical reader, facial recognition and/or other biometric sensors as well as a printer so that a transaction receipt and/or a coupon may be printed and presented to the consumer. The user interface 201 includes a visual display device to provide personalized information, such an advertisement or one or more redeemable discount coupons for purchasing products and services from a vendor or other data related to loyalty programs, promotions and contests. The visual display device includes a monochrome or color LCD display and may also include a touchscreen allowing the consumer to use soft keys to respond to transaction information requests presented to the consumer via the touchscreen.

Figure 3:
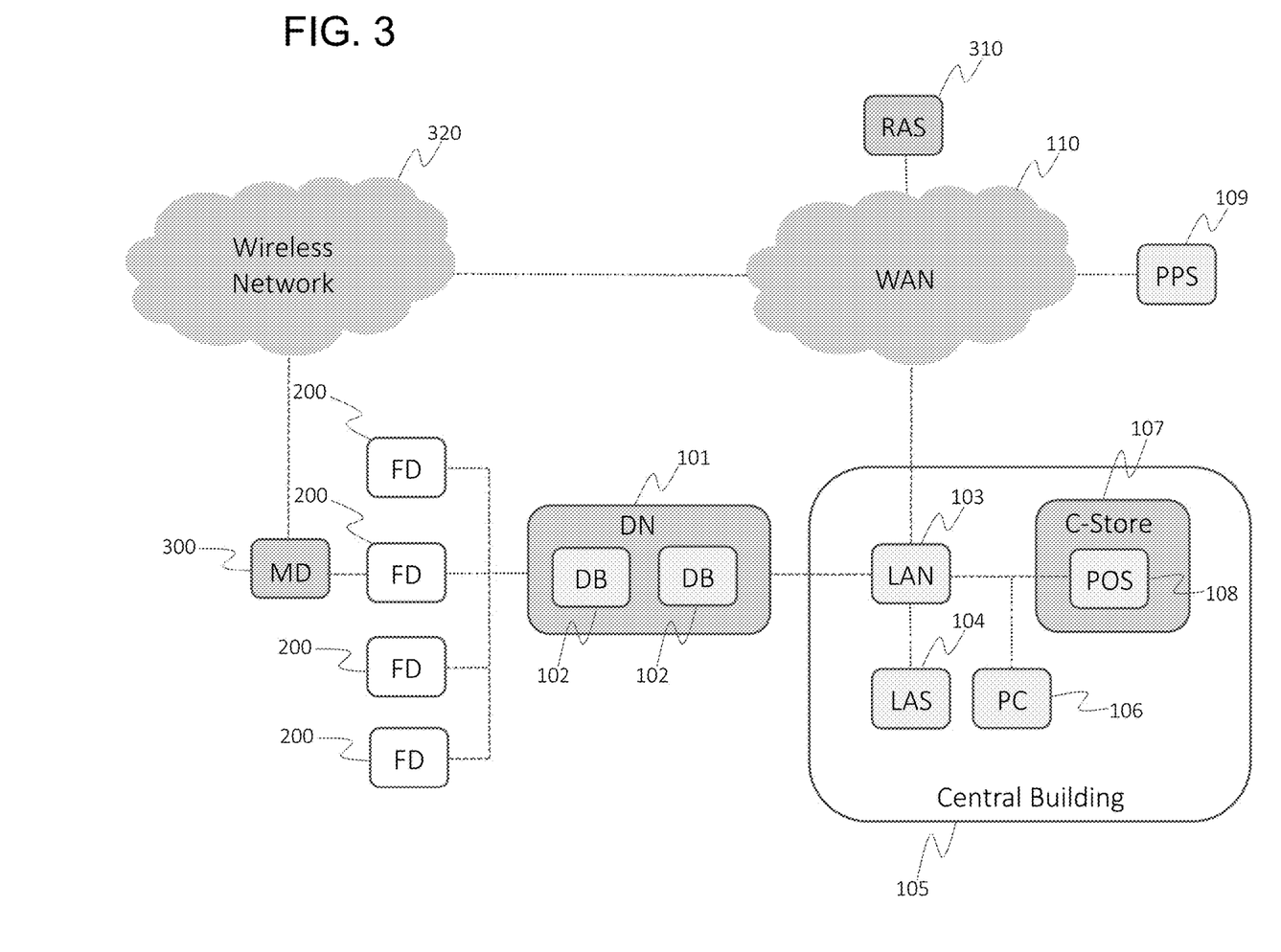
FIG. 3 is a block diagram of a prior art retail fueling station system.

FIG. 3 illustrates prior art of a mobile personal communication device (MD) 300 used with a fuel dispenser 200. The fuel dispenser 200 includes an applications processor 207 and a wireless communication module 208. The wireless communication module 208 operatively connects the personal communication device 300 with the applications processor 207 and includes a transceiver communicating via Bluetooth protocol and/or WIFI protocol. The fuel dispenser application processor 207 operatively connects to a local application server 104 located within the retail fueling station environment via the premises local area network 103 or other intermediate devices. The local application server 104 manages the payment transaction as well as other related activities and is well understood in the art. The local application server 104 communicates with a remote payment processing server 109 for authorization of payment transactions via a communication link to the wide area network 110. Alternatively the personal communication device 300 communicates with a remote application server (RAS) 310 and/or remote payment processing system for authorization of the payment transaction by way of a wireless network 320.

Figure 4:
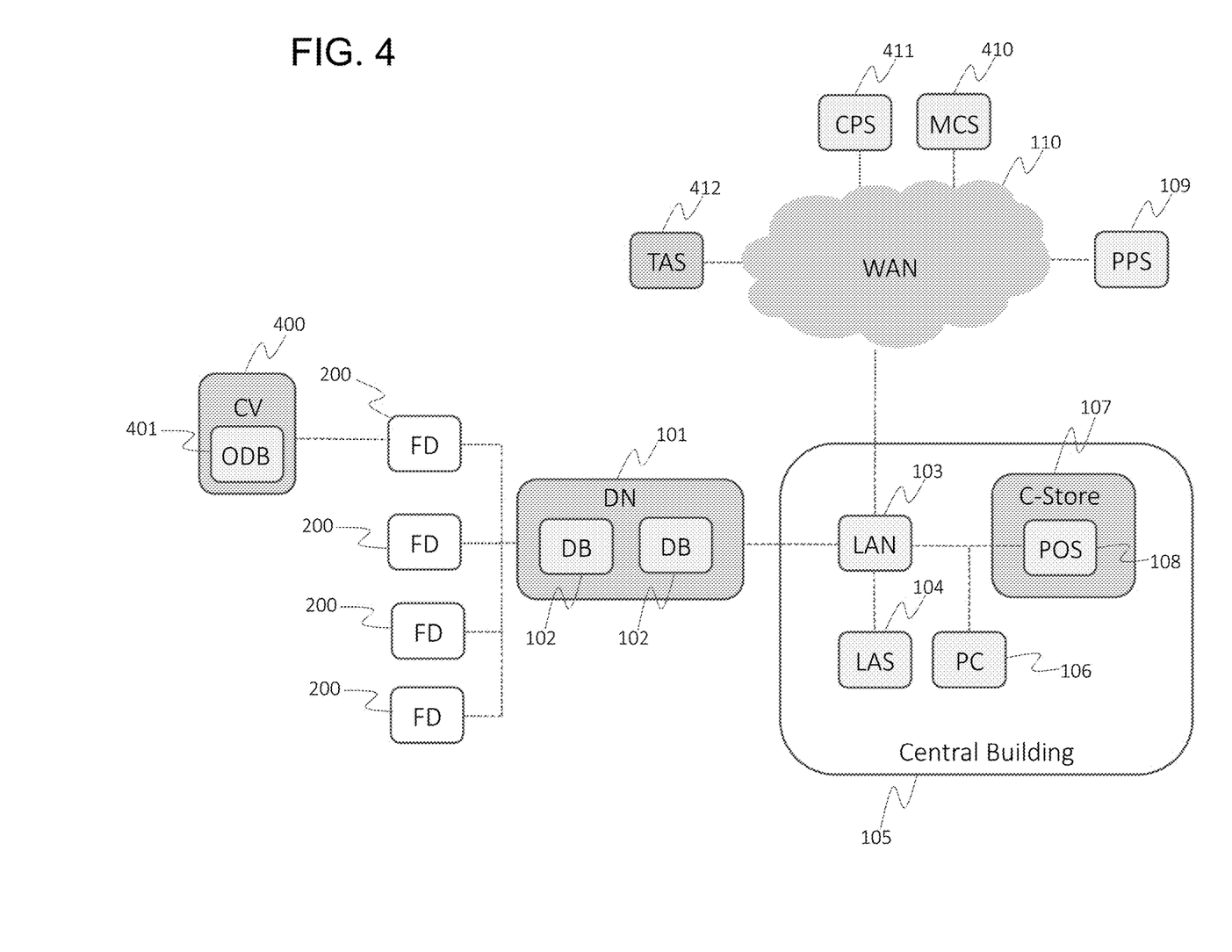
FIG. 4 is a block diagram of a retail fueling station system in accordance with the present invention.

FIG. 4 is a block diagram of a system in accordance with the present invention. In one embodiment the retail fueling station environment includes a central building 105 having a convenience store ("C-store') 107, one or more fuel dispensers 200, a dispenser network 101 and a premises controller 106. The central building may also include a quick serve food outlet or restaurant. The premises controller 106 controls the authorization of fueling transactions and other related activities and is well understood in the art. The premises controller 106 may be a standalone component or may be incorporated into a point of sale (POS) 108 device. The premises controller 106 communicates with a remote payment processing server 109 for payment authorization via a communication link to a wide area network 110. As described above, the plurality of fuel dispensers 200 are operatively connected to a dispenser network 101 which may be accomplished via additional devices, such as distribution box 102 as is understood in the art. The dispenser network 101 is operatively connected to the premises controller via a premises local area network 103 or other intermediate devices, such as a router.

The fuel dispenser 200 includes a wireless communication module 208 and a wired communication module 206. The wireless communication module operatively connects the fuel dispenser with a consumer vehicle (CV) 400. The wireless communication module 208 includes a transceiver communicating via Bluetooth protocol, and/or WIFI protocol or other radio frequency protocol. The wired communications module 206 operatively connects the fuel dispenser to the dispenser network 101.

By way of the wireless communication module 208, presence of a consumer at a fuel dispenser 200 is detected and the fuel dispenser can receive consumer vehicle information directly from the consumer vehicle 400. Communications between the vehicle and the fuel dispenser can use an On Board Diagnostics (OBD) 401 device e.g. OBDII technology in which the consumer vehicle 400 includes an OBDII port. When the wireless communication module 208 detects that the consumer vehicle is proximate thereto, it initiates a communication session with the consumer vehicle 400 and retrieves the consumer vehicle information including the vehicle identification number (VIN) and other vehicle related data such as fuel metrics. Once the consumer vehicle information is received directly from the consumer's vehicle the customized fueling experience can be provided as further described.

Figure 5:
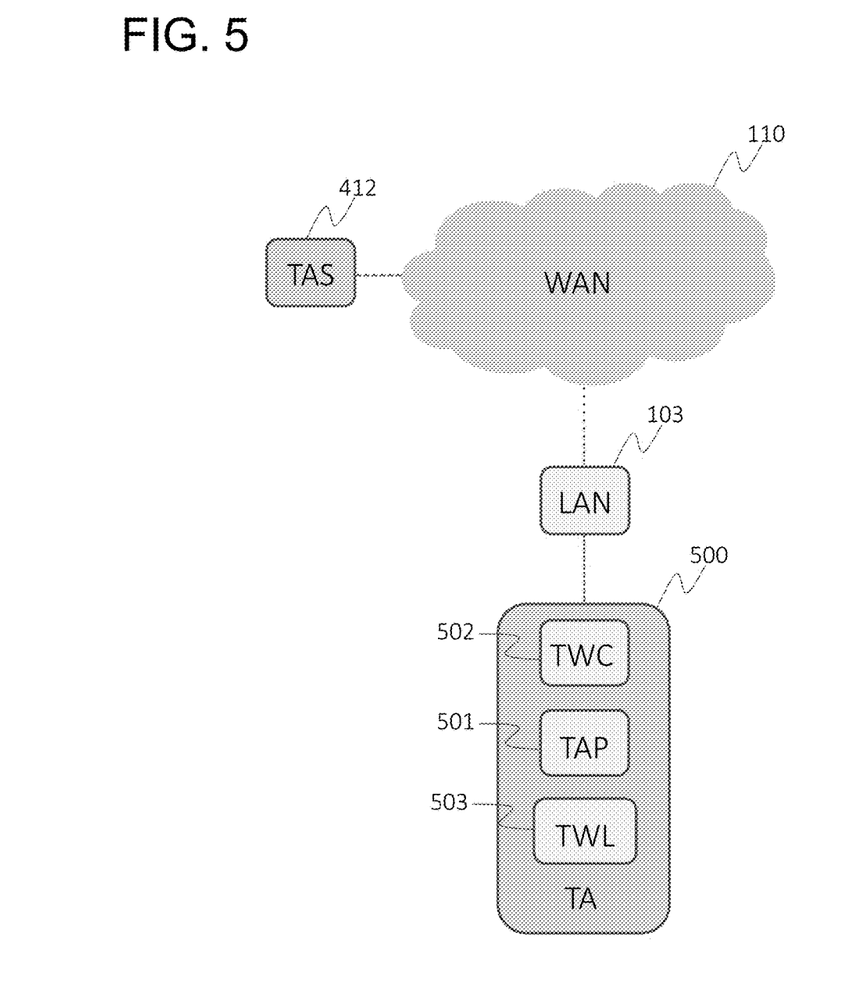
FIG. 5 is a block diagram of a transaction appliance of the present invention.

FIG. 5 illustrates a transaction appliance 500 located within a retail fuel dispensing environment and a transaction server (TAS) 412 is located remotely outside the retail fueling station environment. In a preferred embodiment the transaction appliance 500 is located in the central building 105, alternatively the transaction appliance 500 may be located elsewhere within the retail fueling station environment. The transaction appliance 500 is operatively connected to the plurality of fuel dispensers via the premises local area network 103, dispenser network 101 or other intermediate devices, such as a router. The transaction appliance is also operatively connected to the wide area network 110 which may be accomplished via the premises local area network 103 or other intermediate devices, such as a router.

FIG. 5 further illustrates a block diagram of a transaction appliance 500 of the present invention. The transaction appliance includes an application processor (TAP) 501, a transaction appliance wireless communication module (TWL) 503 and a transaction appliance wired communication module (TWC) 502. The transaction appliance wireless communication module 503 includes a transceiver communicating via Bluetooth protocol and/or WIFI protocol. The transaction appliance wired communication module 502 is operatively connected to the plurality of fuel dispensers 200 via the premises local area network 103 or other intermediate devices, such as a router. Additionally, the transaction appliance wired communication module 502 is operatively connected to the remote transaction server 412 via a communication link to a wide area network 110.

The transaction server 412 is located remotely outside the retail fueling station environment. The transaction server 412 is operatively connected to the transaction appliance via the wide area network 110. Additionally, the transaction server 412 is operatively connected to a remote Consumer Profile Server (CPS) 411 and a Media Content Server (MCS) 410. The Consumer Profile Server 411 matches the consumer vehicle 400 data with a with a known consumer identity to access a database(s) including consumer profile data, consumer history and loyalty program data. Consumer profile data includes associated names, payment method, identities, images and other biometric information. Consumer history includes previously visited fuel dispensers and other vendor locations. Loyalty program data includes a loyalty identifier number, rewards, whether to apply loyalty rewards and/or to promote a purchase of products and/or services and the like. Fueling preferences include preferred fuel grade, fuel type, and/or the amount of fuel required to fill the fuel tank as obtained from the consumer vehicle data.

In a preferred embodiment the user identity is provided to the Media Content Server 410 which dynamically provides customized or targeted advertisements and personalized consumer data during the fuel dispensing time. The advertisements can be specified by the vendor and/or a remote vendor. Remote vendors are remote in the sense that they are not located at the retail fueling facility. A remote vendor includes any commercial seller of products and/or services, vehicle parts, food and drink, etc. Hence a vendors and/or remote vendor can proactively market and/or or sell products and services by way of personalized merchandising content, advertisements and pricing data as well as provide coupons regarding products and/or services.

In other embodiments when the fuel dispenser 200 initiates a communication session with the consumer vehicle 400, the fuel dispenser 200 receives other vehicle characteristics or metrics directly from the consumer vehicle 400. For example the vehicle can monitor driving performance and diagnostics which can be provided to the fuel dispenser 200 for display on the user interface 201 during a fueling session. The fuel dispenser 200 can further receive vehicle operational metrics including mileage performance, whether the vehicle requires maintenance, the amount of fuel currently in the fuel tank, and the like. The consumer vehicle information is transmitted to the transaction appliance 500. The transaction appliance 500, responsively transmits the consumer vehicle information to the transaction server 412. The transaction server 412 invokes personalized consumer data including the amount of fuel needed to fill the vehicle's fuel tank based on the amount of fuel currently in the vehicle's fuel tank, and/or whether the vehicle is in need of maintenance as determined from the received consumer vehicle information and/or consumer profile data.

A consumer transaction is performed based on the selection made by the consumer interacting with the fuel dispenser user interface 201. By using the fuel dispenser user interface 201 the consumer indicates interest in the personalized consumer data. The user interface provides information regarding the products and services and determines whether the consumer desires to purchase a product and/or service or request additional information regarding products or services. If a consumer desires to purchase a product and/or service, the user interface is used to specify order data (e.g. quantity) and payment data. Alternatively payment data may be pre-determined from the consumer profile. If the purchase is approved, the transaction server 412 can then generate a message for the vendor or remote vendor regarding the purchase and generate a receipt for the consumer. Alternatively a vendor coupon or receipt can be printed and the consumer can redeem the product and/or service from premises convenience store 107, quick serve food outlet or restaurant. An example of a product that can be purchased from a fuel dispenser is a cup of coffee. A fuel dispenser consumer could for instance, pre-order a cup of coffee during the fuel dispensing period by providing input to the fuel dispenser user interface. The customer could then pick the cup of coffee from the premises convenience store 107, quick serve food outlet or restaurant by indicating the fuel dispenser number or producing a printed out coupon.

Figure 6:
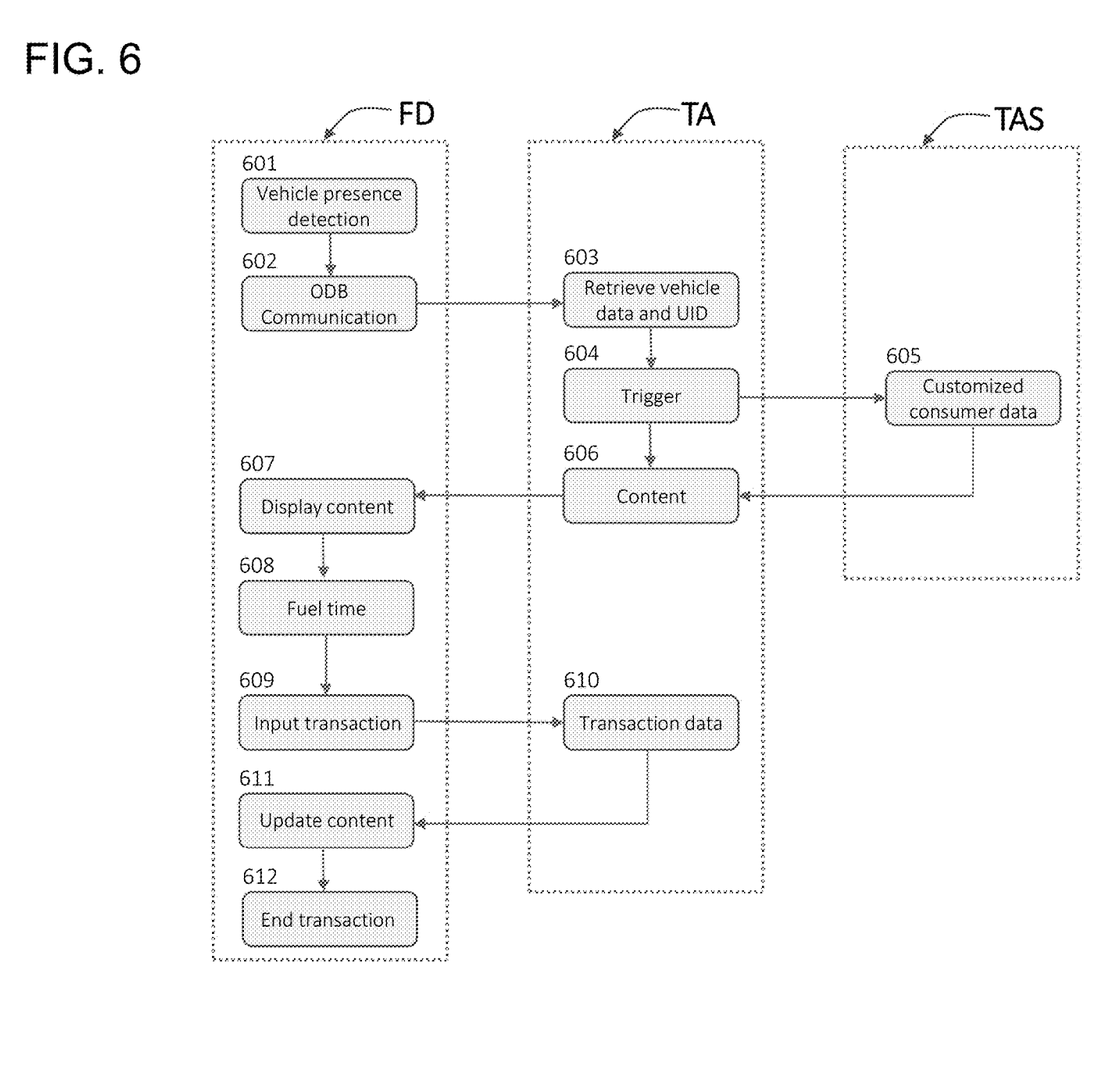
FIG. 6 is a process flow diagram in accordance with the present invention.

FIG. 6 is a process flow diagram illustrating one embodiment of a method for fuel dispensing. At step 601, presence of a consumer vehicle 400 at a fuel dispenser 200 is detected. Upon detecting that the consumer vehicle 400 is proximate thereto; at step 602 the fuel dispenser 400 initiates a communication session with the consumer vehicle On Board Diagnostics (OBD) 401 device. At step 603, the fuel dispenser 200 retrieves the consumer vehicle 400 information including the vehicle identification number, other vehicle related data such as fuel metrics and the corresponding fuel dispenser identification. The consumer vehicle information and fuel dispenser identification are transmitted to the transaction appliance 500 via the premises local area network (LAN) 103. At step 604 the transaction appliance 500 transmits a transaction trigger to the transaction server 412 located remotely outside the retail fueling station environment. At step 605, the transaction server 412 responsively invokes personalized consumer data associated with the transaction trigger including advertising and promotions for purchasing products and services from a vendor. At step 606 the personalized consumer data is provided to the transaction appliance 500; the transaction appliance 500 in turn transmits the personalized consumer data to the fuel dispenser 200 with the corresponding fuel dispenser identification. At step 607, personalized consumer data is displayed on the fuel dispenser user interface 201. The consumer inputs information purchasing products and/or services such as the amount of fuel, authentication code or a personal identification number (PIN), payment information and the like. Once the payment is authorized the fuel pump is activated and fuel dispensing begins. At step 608, personalized consumer data including advertising and promotion information for purchasing products and services from a vendor is offered to the consumer during the time the consumer is dispensing fuel. At step 609, the consumer interacts with the fuel dispenser user interface to effect a transaction such as purchasing products and/or services from a vendor within the retail fueling environment or may include a remote vendor of goods and/or services. At step 610, the transaction appliance 500 provides effected transaction data and transmits the effected transaction data to the fuel dispenser 200 with the corresponding fuel dispenser identification. At step 611, the content on the fuel dispenser user interface 201 visual display device content is updated with the effected transaction data, a printer provides a hard copy receipt of the effected transaction and may also be used for printing and providing promotional information or reward coupons.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for effecting a consumer transaction within a retail fueling station environment, comprising:
   one or more fuel dispensers each configured, in response to detecting a vehicle proximate to a fuel dispenser, to obtain vehicle information of the vehicle via a wireless communication module;
   a transaction appliance located within the retail fueling station environment and configured to receive the vehicle information from the fuel dispenser over a local area network, and to transmit the vehicle information over a wide area network; and a transaction server located remotely outside the retail fueling station environment and configured to receive the vehicle information from the transaction appliance over the wide area network, to obtain a personalized vendor offer determined from the vehicle information and/or a consumer profile data, and to transmit the personalized vendor offer to the transaction appliance over the wide area network;

wherein the transaction appliance is configured to transmit the personalized vendor offer to the fuel dispenser that sent the vehicle information;

wherein the fuel dispenser is configured to display the personalized vendor offer during a fuel dispensing period, to receive user input initiating a purchase associated with the personalized vendor offer, and to transmit an indication of the user input to the transaction appliance; and wherein, in response to receiving the indication of the user input, the transaction server cooperatively executes with the transaction appliance to effect a transaction of the purchase responsive to the personalized vendor offer.

2. The system of claim 1, wherein the personalized vendor offer includes one or more redeemable discount coupons for purchasing products and services from a vendor.

3. The system of claim 1, wherein the wireless communication module includes a transceiver communicating via a radio frequency protocol.

4. The system of claim 3, wherein the wireless communication module is configured to communicate with an OBDII device of the vehicle.

5. The system of claim 1, wherein the fuel dispenser is configured to transmit the vehicle information and a fuel dispenser identification over the local area network via a wired communication module.

6. The system of claim 1, wherein the transaction appliance is configured to receive payment information from the fuel dispenser in connection with a fuel purchase, and to complete the transaction of the purchase of the personalized vendor offer using the payment information.

7. The system of claim 1, wherein the transaction server is in communication with a consumer profile server configured to provide the consumer profile data based on the vehicle information, and is further in communication with a media content server configured to dynamically provide the personalized vendor offer based on the consumer profile data.

8. The system of claim 7, wherein the consumer profile data includes consumer history data associated with the vehicle information.

9. The system of claim 7, wherein the transaction appliance is configured to receive payment information from the consumer profile data, and to complete the transaction of the purchase of the personalized vendor offer using the payment information.

10. The system of claim 1, wherein the transaction server is configured to obtain the personalized vendor offer in connection with a vendor located within the retail fueling station environment.

11. A system for effecting a consumer transaction within a retail fueling station environment, comprising:

a transaction appliance configured, in response to receiving an indication of a presence of a consumer vehicle at a fuel dispenser, to transmit a transaction trigger; and a transaction server configured, in response to receiving the transaction trigger, to invoke personalized consumer data associated with the transaction trigger, and to transmit the personalized consumer data to the transaction appliance;

wherein the transaction appliance is configured to transmit the personalized consumer data to the fuel dispenser for displaying the personalized consumer data on a fuel dispenser user interface during a fuel dispensing time;

wherein the transaction appliance is further configured to provide effected transaction data to the fuel dispenser in response to an effected transaction at the fuel dispenser; and wherein the personalized consumer data displayed on the fuel dispenser user interface is updated with the effected transaction data.

12. The system of claim 11, wherein consumer vehicle information is retrieved from the consumer vehicle.

13. The system of claim 11, wherein consumer vehicle information is transmitted to the transaction appliance.

14. The system of claim 11, wherein a fuel dispenser identification is transmitted to the transaction appliance.

15. The system of claim 11, wherein:
the transaction appliance is located within the retail fueling station environment; and
the transaction server is located outside of the retail fueling station environment.

16. The system of claim 11, wherein a printer provides a hard copy of one or more redeemable discount coupons for purchasing products and services from a vendor.

17. The system of claim 11, wherein:
the transaction trigger includes vehicle data; and
the transaction server is configured to retrieve consumer profile data, consumer history data, and loyalty program data based on the vehicle data.

18. The system of claim 17, wherein:
the transaction server is configured to obtain the personalized consumer data based on the consumer profile data, the consumer history data, and the loyalty program data.

19. The system of claim 17, wherein:
the consumer profile data includes a user name and payment information;
the consumer history data includes previously visited fuel dispensers and vendors; and
the loyalty program data includes a loyalty identifier number.

20. The system of claim 17, wherein:
the vehicle data includes vehicle operation metrics; and
the transaction server is configured to obtain the personalized consumer data based on the vehicle operation metrics.

* * * * *

UNITED STATES PATENT AND TRADEMARK OFFICE
CERTIFICATE OF CORRECTION

| | | |
|---|---|---|
| PATENT NO. | : 11,713,236 B2 | Page 1 of 1 |
| APPLICATION NO. | : 16/821325 | |
| DATED | : August 1, 2023 | |
| INVENTOR(S) | : David Braslavsky et al. | |

It is certified that error appears in the above-identified patent and that said Letters Patent is hereby corrected as shown below:

On the Title Page

Item (73) Assignee should read: Circle K Tech Inc., Laval (CA)

Signed and Sealed this
Eleventh Day of March, 2025

Coke Morgan Stewart
*Acting Director of the United States Patent and Trademark Office*